United States Patent

Blaschke et al.

[15] 3,636,459

[45] Jan. 18, 1972

[54] SMOOTHING CIRCUIT FOR SMOOTHING PULSATING DIRECT VOLTAGES

[72] Inventors: Felix Blaschke, Erlangen; Gerhard Hütter, Maichingen, both of Germany

[73] Assignee: Siemens Aktiengesellschaft, Berlin and Munich, Germany

[22] Filed: Oct. 21, 1969

[21] Appl. No.: 868,193

[30] Foreign Application Priority Data

Oct. 31, 1968 Germany ......................P 18 06 285.6

[52] U.S. Cl. ..............................328/127, 328/150, 328/181, 307/233, 328/145, 307/271

[51] Int. Cl. ........................................H03k 4/30, H03k 4/56

[58] Field of Search ..................307/233, 271; 328/165, 167, 328/150, 127, 181

[56] References Cited

UNITED STATES PATENTS

| | | | |
|---|---|---|---|
| 3,294,981 | 12/1966 | Bose | 307/290 |
| 3,333,109 | 7/1967 | Updike | 307/233 |
| 3,460,000 | 8/1969 | Kiffmeyer | 307/233 |
| 3,471,718 | 10/1969 | Weisz | 307/290 |

*Primary Examiner*—Donald D. Forrer
*Assistant Examiner*—Harold A. Dixon
*Attorney*—Curt M. Avery, Arthur E. Wilfond, Herbert L. Lerner and Daniel J. Tick

[57] ABSTRACT

A smoothing circuit for smoothing pulsating direct voltages utilizes an electronic hysteresis circuit which produces a hysteresis loop having a width adjusted to the instantaneous direct voltage. The hysteresis circuit comprises an electronic function generator for producing a zero-symmetrical hysteresis loop of constant width and an amplifier connected to the output of the function generator. The amplifier has a sensitivity limit corresponding to half the width of the hysteresis loop and a feedback between the amplifier output and the function generator input reduces the constant width of the hysteresis loop.

7 Claims, 9 Drawing Figures

SMOOTHING CIRCUIT FOR SMOOTHING PULSATING DIRECT VOLTAGES

DESCRIPTION OF THE INVENTION

The invention relates to a smoothing circuit. More particularly, the invention relates to a smoothing circuit for smoothing pulsating direct voltages or sawtooth-shaped direct voltages which are provided as outputs of multiphase rectifiers or time constant members having pulses supplied thereto. As an example, a conventional method for frequency-voltage conversion is referred to which comprises sensing or determining the median value of a sequence of voltage pulses of constant pulse-time area by means of time constants or delay members. The resultant output signal is a pulse sequence, frequency-proportional direct voltage which is superimposed with harmonic waves of appropriate amplitude corresponding to the magnitude of the smoothing time constant. Thus, altogether a sawtooth-shaped voltage curve is provided. Although it is basically possible to maintain the harmonic waves as small as desired, with the assistance of a smoothing constant having an appropriately great magnitude, the delay will increase accordingly, so that a frequency change will become noticeable as a corresponding change in the output signal. Previously hereto, low inertia conversion and harmonic wave deprivation were required. These, however, cancel each other out. The purpose of our invention is to completely eliminate the remaining harmonic wave of the aforedescribed voltage, without the imposition of a resultant additional delay.

The principal object of the invention is to provide a new and improved smoothing circuit for smoothing pulsating direct voltages.

An object of our invention is to completely eliminate the remaining harmonic wave of a pulsating direct voltage without the resultant additional delay.

An object of our invention is to provide a smoothing circuit for smoothing pulsating direct voltages, which circuit functions with efficiency, effectiveness and reliability.

In accordance with our invention, a smoothing circuit for smoothing pulsating direct voltages comprises an electronic hysteresis circuit which produces a hysteresis loop having a width adjusted to the instantaneous direct voltage. The fundamental principle of our invention is to completely suppress the voltage ripple of the pulsating direct voltage by means of a special hysteresis loop which is adjusted to the instantaneous direct voltage. A true direct voltage signal is then produced at the output of the hysteresis circuit of our invention. Until the time of our invention, this was possible only by utilizing smoothing components having substantially infinitely large time constants, so that their inertia was no longer tolerable.

In frequency-voltage converters utilized to indicate a number of cycles, which converters convert a sequence of voltage pulses with constant areas into a sawtooth-shaped direct voltage, a simple hysteresis circuit having an adjustable hysteresis width may be provided by an electronic function generator which produces a zero point symmetrical loop of constant width and has at least one amplifier connected to its output. Thus, a smoothing circuit for converting a sequence of voltage pulses of constant pulse area into a sawtooth direct voltage in a frequency-voltage converter comprises an electronic function generator as the hysteresis circuit. The function generator has an input and an output for producing a zero-symmetrical hysteresis loop of constant width. An amplifier has an output and an input connected to the output of the function generator. The amplifier has a sensitivity limit corresponding to half the width of the hysteresis loop. A feedback connected between the output of the amplifier and the input of the function generator feeds back the output voltage of the amplifier to reduce the constant width of the hysteresis loop.

Function generators which produce hysteresis loops of constant width having zero point symmetry are described in a 1967 textbook entitled "Taschenbuch der Nachrichtenverarbeitung" or Pocketbook of Communication Processing, by Steinbuch, page 1152. A function generator of the described type comprises an integrator which follows the magnitude or value of an input signal, reduced by a constant presupply or prefeed-in in order that the followup may be particularly rapid, so that the integrator always changes its output signal with the maximum available adjustment speed. In accordance with another development of our invention, the input of the integrator has at least one snap action amplifier connected thereto. The snap action amplifier has a biasing voltage applied thereto and the output signal of the integrator is fed back to the input of the amplifier.

Thus, the function generator of the hysteresis circuit comprises an integrator having an input and an output. A pair of snap action amplifiers having inputs and outputs are connected to the input of the integrator. A feedback circuit connects the output of the integrator to the inputs of the snap action amplifiers for feeding back the output signal from the integrator to the amplifiers.

In accordance with our invention, a voltage source is coupled to the input of the amplifier and to the input of the function generator for providing the voltage which determines the width of the hysteresis loop produced by the function generator and which determines the sensitivity limit of the amplifier. The voltage source comprises a potentiometer having a constant voltage applied thereto and having a movable contact coupled to the inputs of the function generator and the amplifier.

Occasionally, there is a requirement for a very large operational range of proportionality between the output signal of the frequency-voltage converter and the frequency of the input pulse sequence. In order to provide such a range, another feature of our invention provides an additional function generator connected to the output of the hysteresis circuit for compensating for the nonlinear correlation between the output voltage of the hysteresis circuit and the repetition rate of the voltage pulses. The additional function generator preferably comprises an amplifier and biased threshold diodes connected thereto or an amplifier having a feedback circuit and a diode having a logarithmic characteristic connected in the feedback circuit.

In order that the invention may be readily carried into effect, it will now be described with reference to the accompanying drawings, wherein.

In the FIGS., the same components are identified by the same reference numerals.

Figures 1, 2:
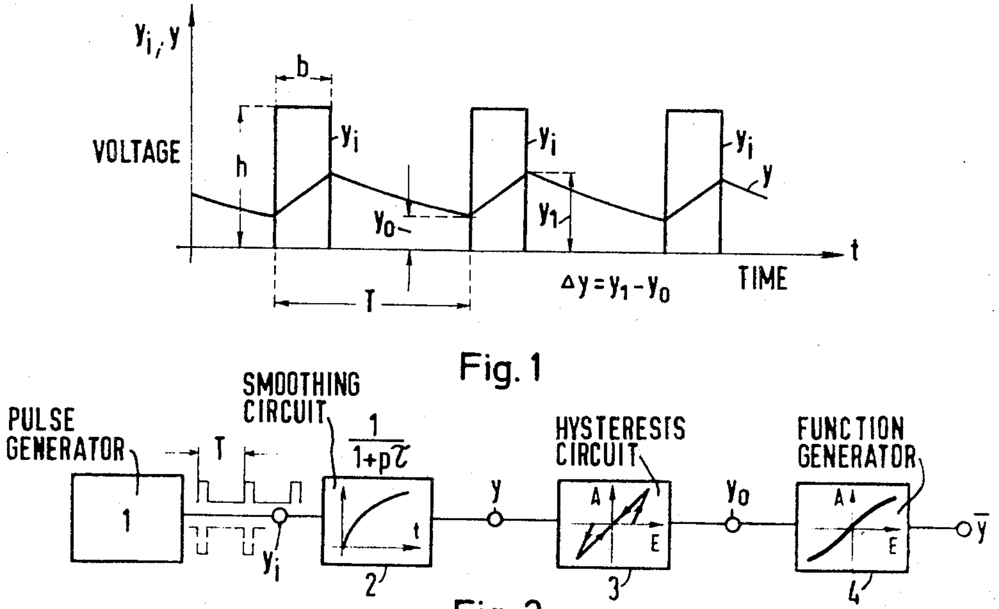
FIG. 1 is a graphical presentation illustrating the operation of the frequency-voltage converter of the invention.
FIG. 2 is a block diagram of an embodiment of the frequency-voltage converter of the invention.

In FIG. 1, each of a sequence of pulses $y_i$ has a pulse width or duration $b$ and a pulse height or amplitude $h$. The pulses $y_i$ follow each other in periods T. The pulse repetition rate, or frequency of the pulse sequence, is thus 1/T. The pulse sequence $y_i$ may be converted, by any suitable smoothing means such as, for example, an RC component, to a sawtooth-shaped voltage $y$. The sawtooth-shaped voltage $y$ is a result of harmonic waves.

At the leading edge of each pulse $y_i$, starting at the minimum value $y_0$, the sawtooth curve $y$ moves upward, at a positive inclination, toward the peak $h$ of the pulse. At the trailing edge of each pulse, starting at the maximum value $y_1$, the sawtooth curve $y$ decreases, at a negative inclination, toward zero. The decreasing portion of the sawtooth wave $y$ is always exponential due to the time constant of the smoothing circuit. An appropriate increase of the time constant of the smoothing circuit permits a reduction in the residual waves or ripples of the sawtooth signal $y$ of the frequency-voltage converter. This is especially effective in the difference range $\Delta y$ between the minimum point $y_0$ and the maximum $y_1$ of the sawtooth wave, which, as hereinbefore described, would simultaneously increase the delay at which the median value of the output voltage may follow a frequency change.

FIG. 2 is an embodiment of the frequency-voltage converter of our invention. A conventional pulse generator 1 produces a sequence of pulses $y_i$. The pulses produced by the pulse generator 1 are as illustrated in FIG. 1 and have a repetition rate of 1/T. The pulse sequence $y_i$ produced by the pulse generator 1 is supplied to a smoothing circuit 2. The smoothing circuit 2 has a time constant $\tau$, so that a sawtooth output signal $y$ is produced by said smoothing circuit.

A hysteresis circuit 3 is connected to the output of the smoothing circuit 2. The block symbol for the hysteresis circuit 3 illustrates the general correlation between the input magnitude E and the output magnitude A of said hysteresis circuit. In accordance with its input-output characteristic, the hysteresis, which is adjusted to the harmonic wave amplitude, suppresses all voltage magnitudes or values of the pulsating direct voltage $y$ which exceed the minimum level $y_0$ provided for a specific control. A true direct voltage, free from harmonic waves, is thus produced, at an unchanged frequency 1/T, at the output of the hysteresis circuit 3.

The harmonic-free direct voltage produced by the hysteresis circuit 3 may supply a rather good linear reproduction of the repetition rate or frequency 1/T of the pulse sequence, within a large range, at a correspondingly low ratio of $b/\tau$, that is, between the pulse width and the smoothing time constant. To meet greater demands with respect to the linearity, a function generator 4 may be utilized and connected to the output of the hysteresis circuit 3. The function generator 4 compensates for or balances exactly the nonlinear correlation between the minimum value $y_0$ and the median value $\overline{y}$ of the output voltage $y$ of the smoothing circuit 2, independently of the aforementioned ratio $b/\tau$. The characteristic of the hysteresis circuit 3, as well as of the function generator 4, may be designed with zero symmetry, in consideration of the technical measuring requirements, following the determination of "negative" frequencies or pulses $y_i$ with negative pulse-time areas.

Figure 3:
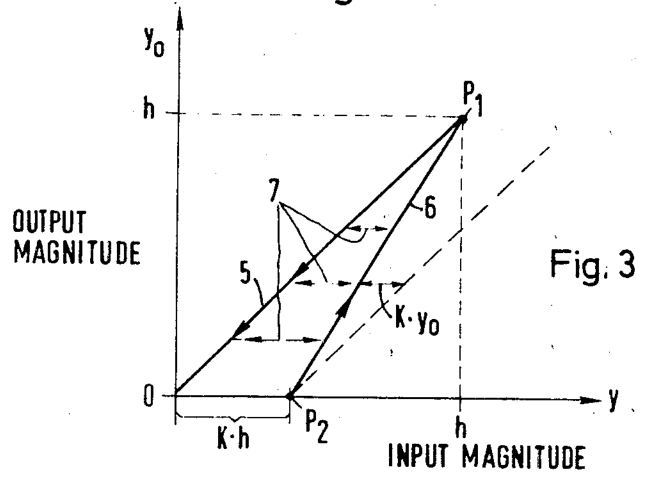
FIG. 3 is a graphical presentation illustrating the characteristic of the hysteresis circuit of the smoothing circuit of our invention.

FIG. 3 illustrates the characteristic of the hysteresis circuit of the invention. In FIG. 3, the abscissa represents the input magnitude $y$ and the ordinate represents the output magnitude $y_0$. The hysteresis characteristic comprises a straight line 5, defined by the equation $y_0=y$, and a second straight line 6, which meets the line 5 at a point $P_1$. The line 5 extends from the zero point or origin to the point $P_1$ and the line 6 extends from a point $P_2$ on the abscissa to the point $P_1$. The lines 5 and 6 may be passed only in the directions of the arrows thereon.

The width 7, that is, the horizontal dimensions of the hysteresis curve of FIG. 3, are dependent upon the output magnitude $y_0$ in accordance with the equation $B=K(h-y_0)$, wherein $B$ is the width of the hysteresis curve and $K$ is a magnitude which depends upon the ratio of the pulse width $b$ to the smoothing time constant in accordance with the relation $K=1-e^{-b/\tau}$. In the foregoing equation, $h$ represents the amplitude of the pulses produced by the pulse generator 1.

Each magnitude of the output voltage $y_0$ is thus provided with a very specific width of the hysteresis loop. A minimum width of $Kh$ is provided especially in the abscissa area $OP_2$ of the straight line 6. This results in the fact that when the output magnitude $y$ of the smoothing circuit 2 fluctuates between its minimum value $y_0$ and its maximum value $y_1$, the operating or working point moves on the horizontal part 7 of the hysteresis loop, and the value or magnitude $y_0$ always appears at the output of the hysteresis circuit 3.

Figure 4:
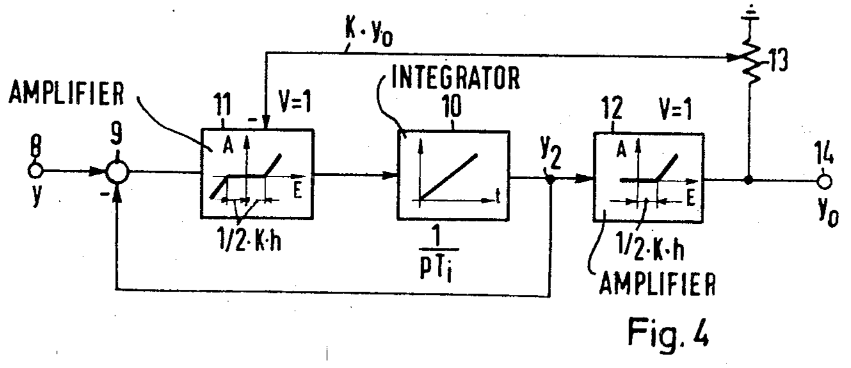
FIG. 4 is a block diagram of an embodiment of a hysteresis circuit, the characteristic of which is shown in FIG. 3.

FIG. 4 illustrates a basic circuit for the hysteresis circuit 3 of FIG. 2, having a hysteresis characteristic shown in FIG. 3. An integrator 10 produces an output signal which is supplied to a mixing point 9 in the input to an amplifier 11. The input of the integrator 10 is connected to the output of the amplifier 11. The output voltage $y$ of the smoothing circuit 2 of FIG. 2 is supplied to an input terminal 8 and thence to the mixing point 9. At the mixing point, the output signal of the integrator 10 is subtracted from the output voltage $y$ of the smoothing circuit 2, and the difference voltage is applied to the input of the amplifier 11. The amplifier 11 has an amplification factor V which is equal to 1 and a sensitivity or threshold level having a value ½ $Kh$ for the positive and negative values of its input magnitude E.

The integrator 10 and amplifier 11 function as a backlash or hysteresis simulator and the components 9, 10 and 11 function as a known electronic function generator. The function generator or hysteresis simulator produces a zero symmetrical hysteresis loop of constant width. An amplifier 12 has its input connected to the output of the integrator 10. The amplifier 12 functions to shift the hysteresis loop as well as to alter the width of said hysteresis loop (FIG. 3) in accordance with the output signal or voltage produced by said amplifier. The amplifier 12 has an amplification factor V or 1 and a sensitivity of ½ $Kh$, the same as the amplifier 11.

A potentiometer 13 provides a voltage having a magnitude $Ky_0$ from the output voltage $y_0$ produced by the amplifier 12. The output voltage $y_0$ of the amplifier 12 is provided at an output terminal 14. The voltage $Ky_0$ is applied as a feedback voltage to the amplifier 11 in a manner whereby its sensitivity level, which is subordinated to the positive direction of its input voltage or signal E, is decreased. The integrating period $T_i$ of the integrator 10 is preferably rated sufficiently short so that the output signal or voltage of said integrator may follow the input signal or voltage thereof with the shortest possible delay.

The hysteresis circuit of FIG. 4 may reproduce, in a quadrant, a hysteresis characteristic as shown in FIG. 3. This is illustrated in greater detail in FIGS. 5 and 6. As hereinbefore mentioned, the function generator comprising the components 9, 10 and 11 will produce a zero symmetrical hysteresis loop of constant width in accordance with the straight lines 15 and 16 of FIG. 5. When the output magnitude $y_2$ of the integrator 10 exceeds the sensitivity level ½ $Kh$ of the amplifier 12, as a result of the feedback, the voltage $Ky_0$ provided by the potentiometer 13 produces a corresponding decrease in the width of the hysteresis loop.

Figures 5, 6:
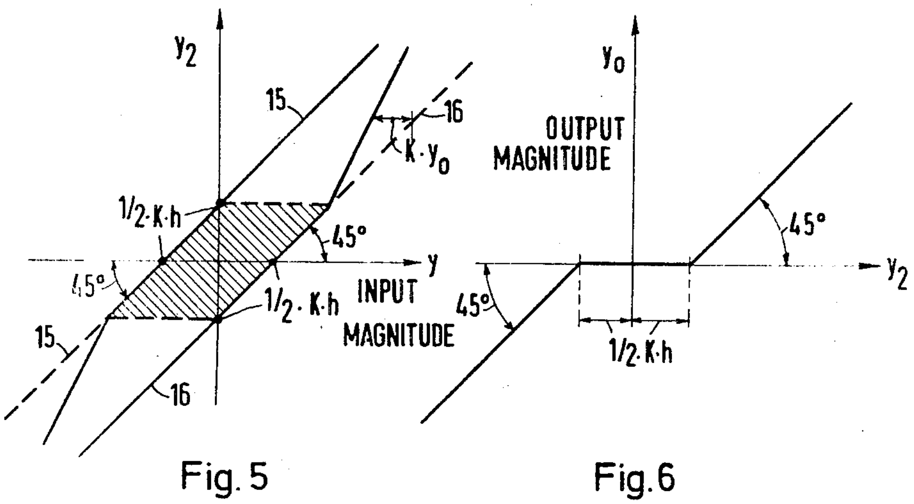
FIGS. 5 and 6 are graphical presentations of portions of the characteristic of the hysteresis circuit.

As shown in detail in curve $y_2$, which depends upon $y$ in FIG. 5, and as shown in curve $y_0$, which depends upon $y_2$ in FIG. 6, the operation of the amplifier 12 of FIG. 4 suppresses the area of the hysteresis loop in the first quadrant, as shown in broken lines. Thus, in the first quadrant, the curve of FIG. 3 is between the input magnitude $y$ at the input terminal 8 of FIG. 4 and the output magnitude $y_0$ at the output terminal 14 of FIG. 4. These considerations are equally applicable to the third quadrant, in an analogous expansion.

Figure 7:
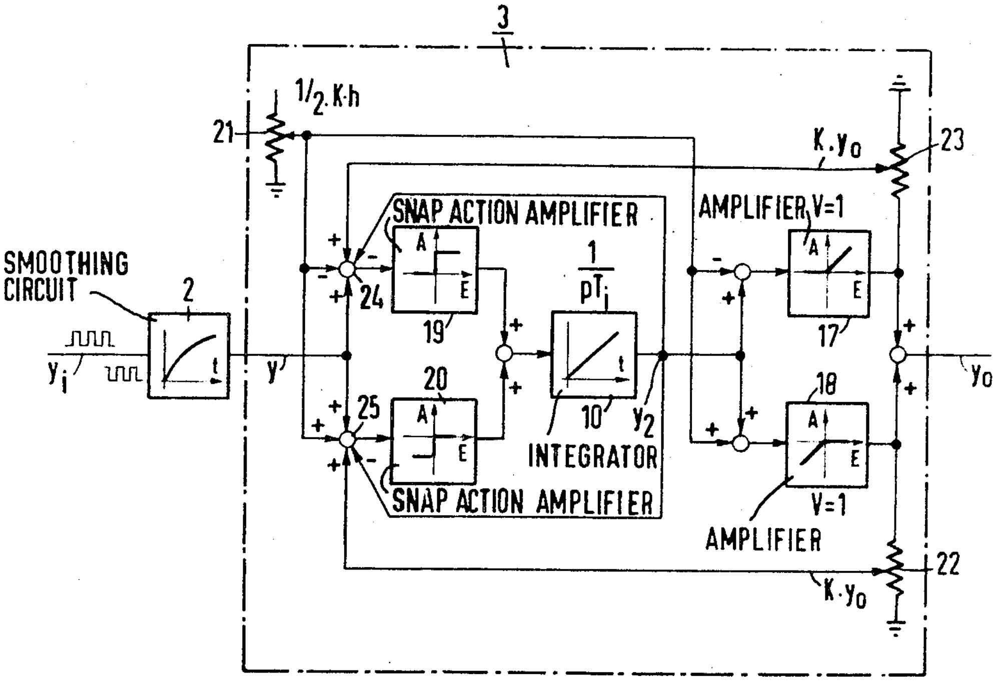
FIG. 7 is a block diagram of another embodiment of a hysteresis circuit of our invention.

FIG. 7 is an embodiment of a circuit which provides a zero point symmetrical reproduction of the hysteresis loop of FIG. 3, as illustrated in the block representing the hysteresis circuit 3 in FIG. 2. The circuit of FIG. 7 comprises, essentially, an expansion of the embodiment of FIG. 4, for input pulses $y_i$ of a negative DC average value, indicated as the output magnitude of the pulse generator 1 of FIG. 2. Such pulses must be measured, for example, when the frequency-voltage converter is utilized to measure the cycles, and an additional indication is required relative to the direction of rotation. Pulses having positive or negative average DC value would then be supplied to the smoothing circuit 2 of FIG. 2 in accordance with the direction of rotation.

When measuring cycles, the pulse generator 1 of FIG. 2 may comprise, for example, a monostable flip-flop which is triggered by pulses produced in a known manner, which pulses are in proportion to the number of cycles. In a further development of our invention, in accordance with FIG. 7, the amplifier 12 of FIG. 4 may be replaced by two amplifiers corresponding to the two polarities which are feasible for the output magnitude $y_0$. The amplifier 11 of FIG. 4 may be replaced by two amplifiers 19 and 20 in the embodiment of FIG. 7. The two amplifiers 19 and 20 are snap action amplifiers.

In FIG. 7, the utilization of the snap action amplifiers 19 and 20 results in the voltage applied to the input of the integrator 10 assuming a maximum magnitude after the response of said amplifiers. The output magnitude $y_2$ of the integrator 10 thus provides, in the shortest possible time, a magnitude which is predetermined by the input magnitude. The sensitivity limits provided for the amplifiers 17, 18, 19 and 20 are effected by biasing voltages which correspond to the magnitude ½ $Kh$ provided by a potentiometer 21 in FIG. 7. The potentiometer 21 is energized by a constant voltage. The biasing voltages are applied to the input circuits of the amplifiers 17, 18, 19 and 20.

An additional voltage, depending upon the output magnitude $y_0$, is applied to the amplifiers 19 and 20, in correspondence with the magnitude $Ky_0$ which is provided by a pair of potentiometers 22 and 23. The output voltage of the amplifier 17 is applied to the potentiometer 23. The output voltage of the amplifier 17 is applied to the potentiometer 23. The output voltage of the amplifier 17 is always of zero or positive magnitude. The output voltage of the amplifier 18 is applied to the potentiometer 22. The output voltage of the amplifier 18 is always of zero or negative magnitude. Thus, when the voltages at the tap points of the potentiometers 21 and 22 are applied to adding or summing points 24 and 25 of the circuit of FIG. 7, in the indicated directions, the sensitivity limits of the amplifiers 19 and 20 are decreased in proportion to the output, analogously to FIG. 4.

Figures 8, 9:
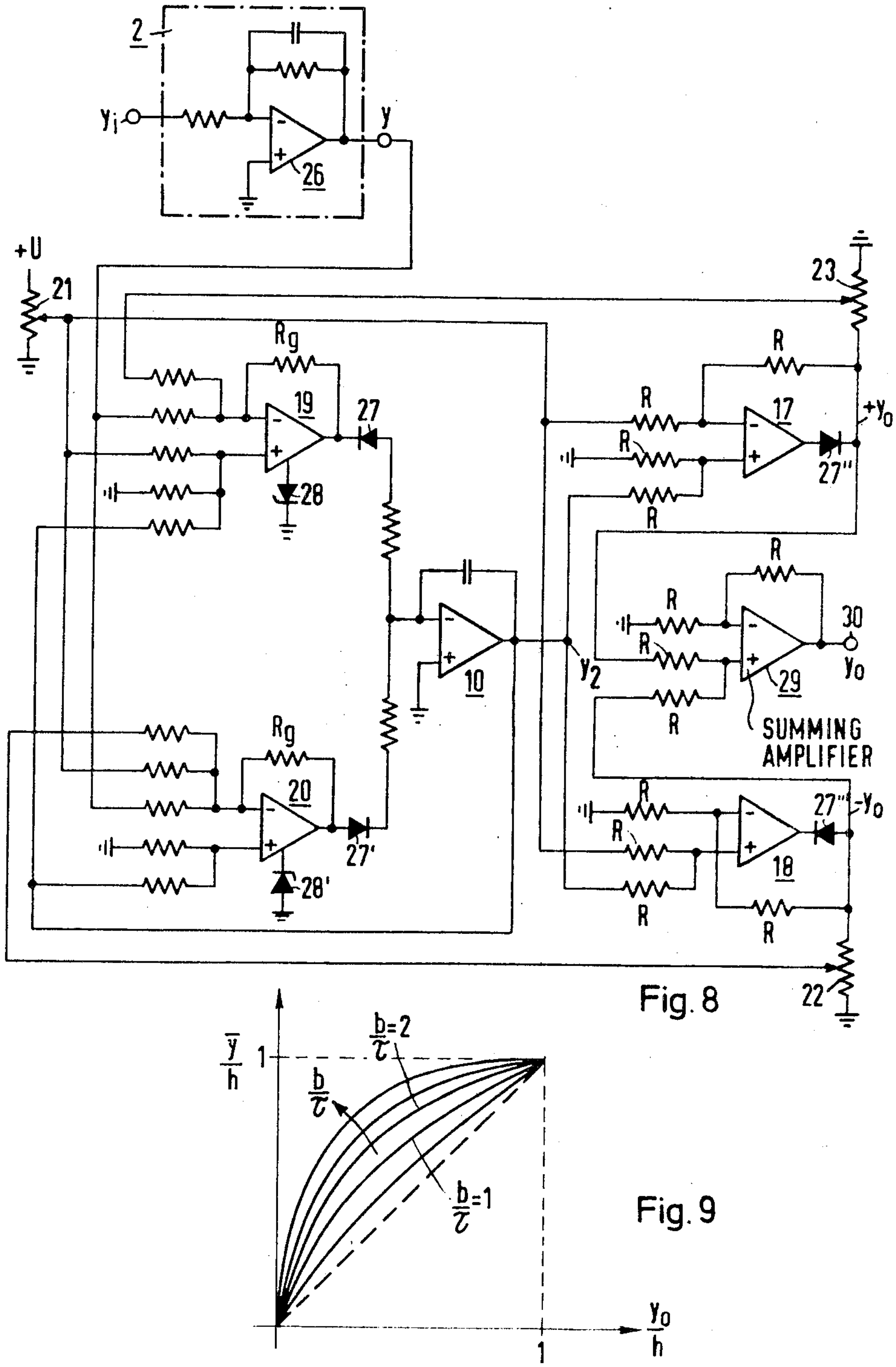
FIG. 8 is a circuit diagram of the embodiment of FIG. 7.
FIG. 9 is a graphical presentation illustrating the operation of the embodiment of FIG. 7.

FIG. 8 is a circuit diagram of the embodiment of FIG. 7. Each of the amplifiers 10, 17, 18, 19, 20, 26 and 29 is an electronic amplifier having an essentially infinitely high-voltage amplification in its no-load condition. A feedback resistance $R_g$ of each of the amplifiers 19 and 20 is rated high, relative to the input resistances, in order to produce the characteristic. One polarity of the output signals or voltages of the amplifiers 17, 18, 19 and 20 is suppressed by appropriately poled diodes 27, 27', 27'' and 27'''. The output signals or voltages of the snap action amplifiers 19 and 20 are limited to a maximum magnitude by Zener diodes 28 and 28', respectively.

The output signals or voltages of the amplifiers 17 and 18 are supplied to a summing amplifier 29. Each of the amplifiers 17, 18, 19 and 20 is a difference amplifier, in which the sum of the conductances and resistances which are supplied to the positive input are equal to the sum of the conductances and resistances supplied to the negative input. The output of the summing amplifier 29 is provided at an output terminal 30. The output voltage $y_0$ of the summing amplifier 29 corresponds to the minimum magnitude of the sawtooth output voltage $y$ of the smoothing circuit 2 (FIG. 2). The output voltage $y_0$ of the summing amplifier 29 may function as a measure or quantity of the pulse frequency or repetition rate 1/T by changing, within a specific range, approximately in proportion with such frequency. In order to meet greater requirements with respect to such proportionality, especially over a large range, the output of the hysteresis circuit 3 (FIG. 2), that is, the output voltage $y_0$ provided at the output terminal 30 of FIG. 8, may be connected to a function generator, as shown in FIG. 2. The characteristic of the function generator is that shown in the block representing said function generator in FIG. 2. The characteristic of the function generator 4 of FIG. 2 relates the minimum magnitude $y_0$ of the sawtooth curve $y$ with its DC median magnitude $\bar{y}$, in accordance with the equation $$\bar{y}=h\, b/\tau\, [ln\,(1+h/y_0\, Ke^{b/\tau}\ )]^{-1}.$$

FIG. 9 illustrates the functions provided by the function generator 4 of FIG. 2, at variable ratios between the pulse width or duration $b$ and the smoothing time constant $\tau$. These functions are basically provided by known types of function generators, especially those utilized in analog computer systems. The function generators utilize, for example, electronic amplifiers which include a plurality of biased threshold diodes in their feedback circuits. The diodes become conductive when the output voltage increases, thereby permitting the flow of an additional feedback current which reduces the amplification factor.

The designed function curve (FIG. 9) may thereby be approximated with any desired exactness, by a buckling characteristic. The buckling points are determined by the corresponding biasing voltages of the threshold diodes. The corresponding curve inclines through the corresponding active feedback resistance. It is also possible, in this regard, to provide the desired function curve with the assistance of a single diode, connected in the feedback of an electronic amplifier, provided such diode has an appropriate logarithmic characteristic.

Our invention is important in fields other than frequency-voltage conversion, due to the fact that the aforedescribed principle of the output-dependent alteration in the width of the hysteresis loop, utilized to smooth a pulsating voltage, does not depend upon the manner in which the voltages are produced. Hence, our invention may be utilized to advantage, for example, for the removal of residual harmonics or harmonic waves of rectified output voltages in AC machines, which are also utilized to measure the speed of rotation. Generally, our invention may be utilized wherever there is a defined correlation between the median magnitude or value and a pulsating direct voltage.

While the invention has been described by means of specific examples and in specific embodiments, we do not wish to be limited thereto, for obvious modifications will occur to those skilled in the art without departing from the spirit and scope of the invention.

We claim:

1. A smoothing circuit for smoothing sawtooth and pulsating direct voltages comprising a hysteresis simulator having an input and an output for producing a zero-symmetrical hysteresis loop of constant width; amplifier means having an output and an input connected to the output of said simulator, said amplifier means having a sensitivity limit corresponding to half the width of said hysteresis loop; and feedback means connected between the output of said amplifier means and the input of said simulator for feeding back the output voltage of said amplifier means to reduce the constant width of said hysteresis loop.

2. A smoothing circuit as claimed in claim 1, wherein the hysteresis simulator comprises an integrator having an input and an output, a pair of snap action amplifiers having inputs and outputs connected to the input of said integrator, and feedback means connecting the output of said integrator to the inputs of said snap action amplifiers for feeding back the output signal of said integrator to said amplifiers.

3. A smoothing circuit as claimed in claim 2, further comprising voltage means coupled to the input of said amplifier means and to the input of said hysteresis simulator for providing the voltage which determines the width of the hysteresis loop produced by said hysteresis simulator and which determines the sensitivity limit of said amplifier means, said voltage means comprising a potentiometer having a constant voltage applied thereto and having a movable contact coupled to the inputs of said hysteresis simulator and said amplifier means and an additional hysteresis simulator connected to the output of said amplifier means for compensating for the nonlinear correlation between the output voltage of said amplifier means and the repetition rate of said voltage pulses.

4. A smoothing circuit as claimed in claim 1, further comprising voltage means coupled to the input of said amplifier means and to the input of said hysteresis simulator for providing the voltage which determines the width of the hysteresis loop produced by said hysteresis simulator and which determines the sensitivity limit of said amplifier means, said voltage means comprising a potentiometer having a constant voltage applied thereto and having a movable contact coupled to the inputs of said hysteresis simulator and said amplifier means.

5. A smoothing circuit as claimed in claim 1, further comprising an additional hysteresis simulator connected to the output of said amplifier means for compensating for the nonlinear correlation between the output voltage of said amplifier means and the repetition rate of said voltage pulses.

6. A smoothing circuit as claimed in claim 5, wherein said hysteresis simulator comprises an amplifier and biased threshold diodes connected thereto.

7. A smoothing circuit as claimed in claim 5, wherein said hysteresis simulator comprises an amplifier having a feedback circuit and a diode connected in said feedback circuit, said diode having a logarithmic characteristic.

* * * * *